June 12, 1934.  A. R. MEISTER  1,962,782
TRANSMISSION
Original Filed April 30, 1929  3 Sheets-Sheet 1

INVENTOR.
ALBERT R. MEISTER
BY
ATTORNEYS.

June 12, 1934. A. R. MEISTER 1,962,782
TRANSMISSION
Original Filed April 30, 1929  3 Sheets-Sheet 2

INVENTOR
ALBERT R. MEISTER
By
ATTORNEYS.

Patented June 12, 1934

1,962,782

UNITED STATES PATENT OFFICE 1,962,782

TRANSMISSION

Albert R. Meister, Sacramento, Calif.

Application April 30, 1929, Serial No. 359,337
Renewed January 8, 1934

7 Claims. (Cl. 180—54)

The present invention relates to a transmission device connected between two motors so as to synchronize the motors, and to transmit power therefrom in a direction transverse to the axes of the motors.

In the present day manufacture of vehicles for transportation purposes, the saving of paying space without disturbing the proper balance of the vehicle, is one of the important problems. In some type of vehicles a multiplicity of power plants, namely motors, are utilized, each motor being connected by a special transmission to the adjacent axle for driving the same. These multiple motor drives presented great difficulties on account of unbalanced torque on the axles of the vehicle, and also on account of the lack of accurate synchronization of the different motors on the vehicle. Experiments have been made also by disposing the motors end to end, however, the transmission of power from these motors was such as to necessitate the mounting of the entire drive mechanism within the useful space of the vehicle.

The primary object of my invention is the provision of a transmission device, transmitting power from two oppositely disposed motors in such a manner as to positively synchronize the operation of the motors and equalize the driving torque thereof; at the same time permitting the transmission of the combined power of the motors to a driving shaft disposed transversely to the axes of said motors; such arrangement and construction allowing the assembly of the entire power plant and transmission transversely to the main frame of the vehicle, the axes of the motors being substantially parallel with the axles of the vehicle driven by the power plant.

The power plant constructed in accordance with my invention may be disposed beneath the body of the vehicle, so as to take up but a minimum of the useful, paying space of the vehicle. My transmission is so arranged as to equalize the action of the motors, and to positively and constantly synchronize their operation at the same time permitting the facile use and operation of more or less standard shifting and clutch mechanisms.

Other objects and advantages are to provide a transmission device that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein

Figure 1:
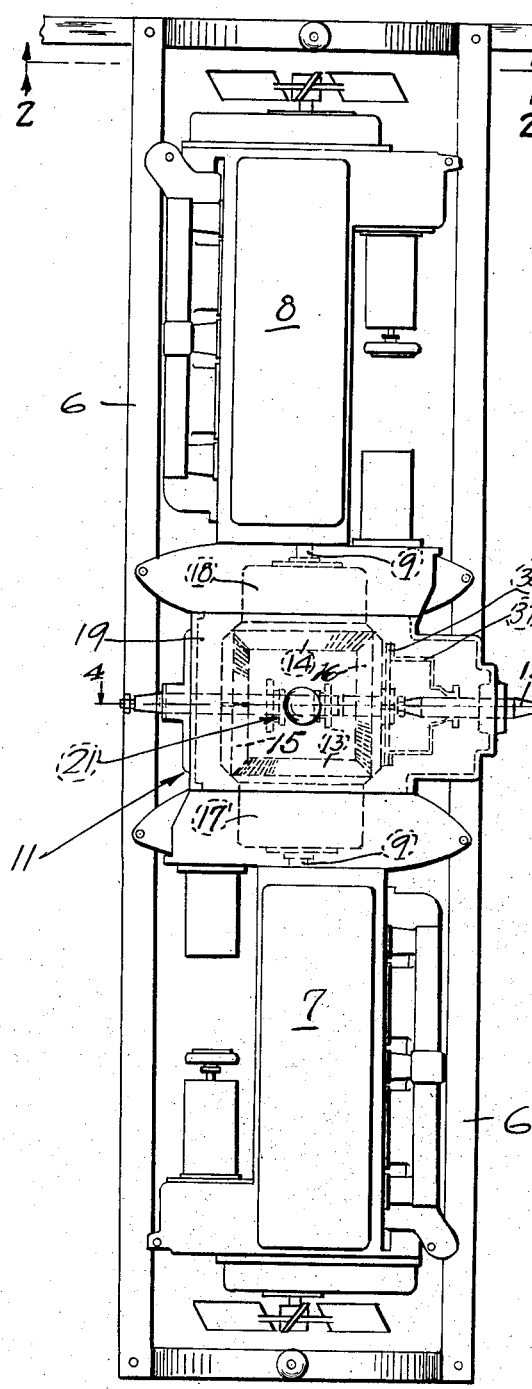
Fig. 1 is a plan view of the power plant and the transmission constructed in accordance with my invention.
Figure 2:
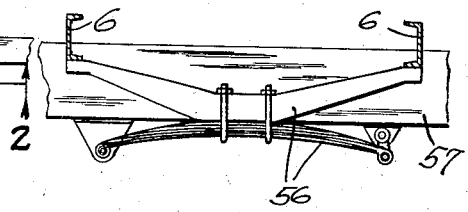
Fig. 2 is a sectional view taken on the line 2—2 of Fig. 1 and it shows the supporting of the power plant on springs.

I accomplish the object of my invention by the use of an auxiliary frame 6, extending transversely across the main frame of the vehicle. On the auxiliary frame 6 are mounted engines 7 and 8 disposed end to end with their crank shafts 9 in alignment with each other. The engines are spaced from each other so as to provide for the assembly of a transmission 11 therebetween. The engines 7 and 8 may be of any standard type multi-cylinder engines of such a length as to be adapted to be mounted on the frame 6 in the aforesaid manner, and still be within the wheel base of the vehicle on which they are used.

Inasmuch as in the customary construction of vehicles the axles thereof are transverse to the main frame, it is apparent that the shafts of the engines 7 and 8 will be parallel not only with the auxiliary frame 6 but also with the axles of the vehicle.

A power shaft 12 is driven by the transmission 11 and transmits movement thru the usual differential or the like, to the respective axle of the vehicle.

The engines 7 and 8 are connected to each other and to the transmission by means of bevel gears 13, 14, 15 and 16. Bevel gear 13 is fixedly mounted on the fly-wheel 17 of the engine 7, while bevel gear 14 is fixedly mounted on the flywheel 18 of engine 8. The remaining bevel gears 15 and 16 are supported in a transmission casing 19, in constant mesh with the bevel gears 13 and 14 and are rotated thereby. The direction of rotation of the engines 7 and 8 are opposite to each other, therefore the gears 13 and 14 are rotated by said engines in opposite directions to each other, whereby the bevel gears 15 and 16 are also rotated oppositely to each other. The constant meshing connection of the said bevel gears to each other, results in complete and constant synchronization of the operation of the engines 7 and 8. Due to this accurate constant synchronization the positions and strokes of the pistons of the engine 7 relatively to the positions and strokes of the pistons of the other engine 8, are maintained constant. Consequently the driving torque transmitted thru the said bevel gear is equalized and balanced.

A selective transmission gearing may be connected in any suitable manner to take off the power from the bevel gear 15 or 16.

Figure 4:
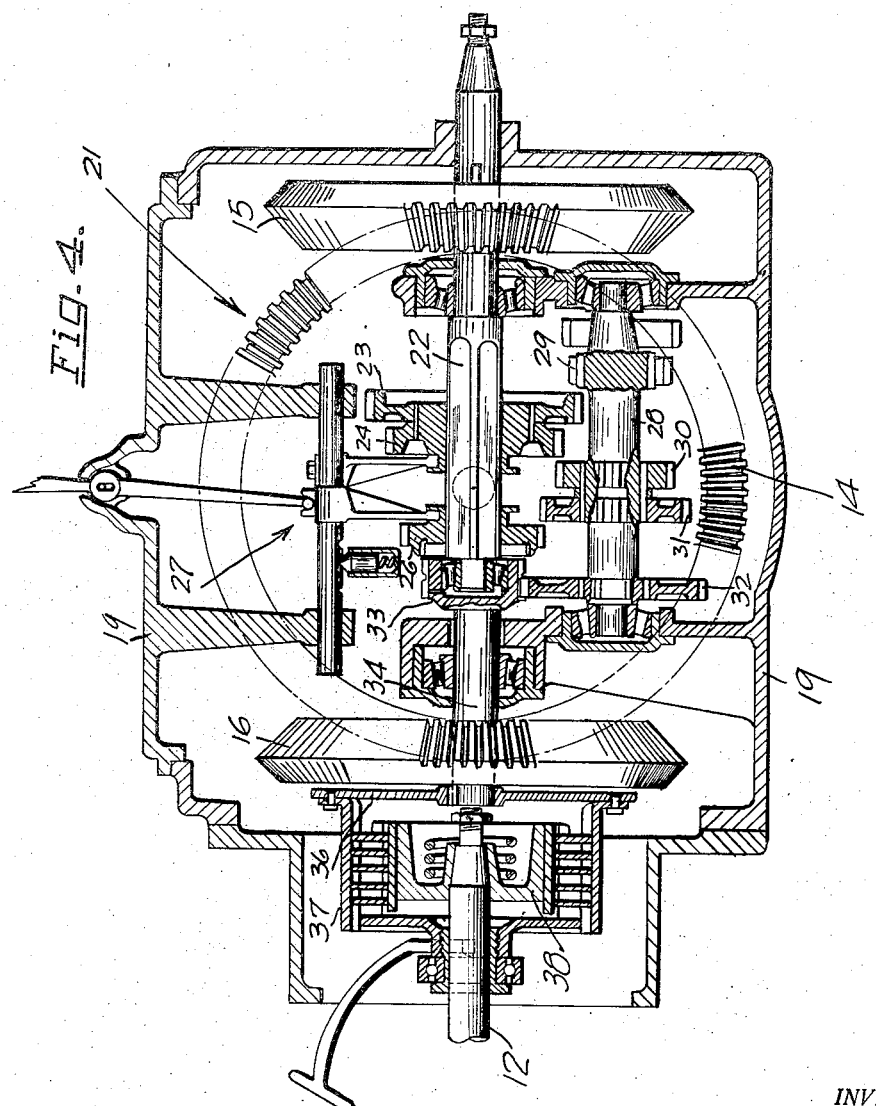
Fig. 4 is a sectional view of the transmission of the power plant, the section being taken on the line 4—4 of Fig. 1.

In the illustration shown in Fig. 1, a standard selective transmission gearing 21 is supported within the casing 19 and between the bevel gears 13, 14, 15 and 16. This arrangement is clearly shown in the sectional view in Fig. 4. The bevel gear 15 is keyed to the transmission shaft 22, which latter is supported in suitable bearings on the casing 19; on the shaft 22 are slidably keyed shift gears 23, 24 and 26, operated by the usual shifting mechanism denoted in its entirety by the numeral 27. On a counter shaft 28 are fixed gears 29, 30 and 31, so as to be selectively engageable by the corresponding gears 23, 24 and 26. The countershaft 28 is rotatably supported on suitable bearings on the bottom of the casing 19. Another gear 32 fixed on the countershaft 28 is constantly in mesh with a transmission gear 33, which latter rotates a stub shaft 34. It is to be noted that the stub shaft is also supported on suitable bearings extending from the bottom of the casing 11. It is also to be noted that the gear 16 idles on the stub shaft 34, the latter extending thru the former. On the free end of the stub shaft beyond the bevel gear 16 is fixedly mounted a disk 36, on which latter in turn is mounted a clutch element 37. A complemental clutch element 38 is mounted in the usual manner on the power shaft 12 and is adapted to be brought into engagement with the first clutch element 37 thereby receiving rotation from the stub shaft 34 at times when a set of speed reduction gears of the selective transmission is shifted in mesh. In this manner while the four bevel gears synchronize the motors 7 and 8 and equalize the driving torque, at the same time the power is taken off of one of the bevel gears, namely bevel gear 15, and is transmitted thru the selective transmission to the power shaft 12 in the usual manner.

The power shaft 12 is connected to the axle of the vehicle in any standard manner.

The power plant heretofore described may be used for driving either the rear or the front axle of the vehicle. By using a suitable double transmission instead of the selective transmission shown, my power plant may effectively drive both the front and rear axles in synchronism, thereby delivering well balanced motive power to both the rear and front wheels of a vehicle.

Figure 3:
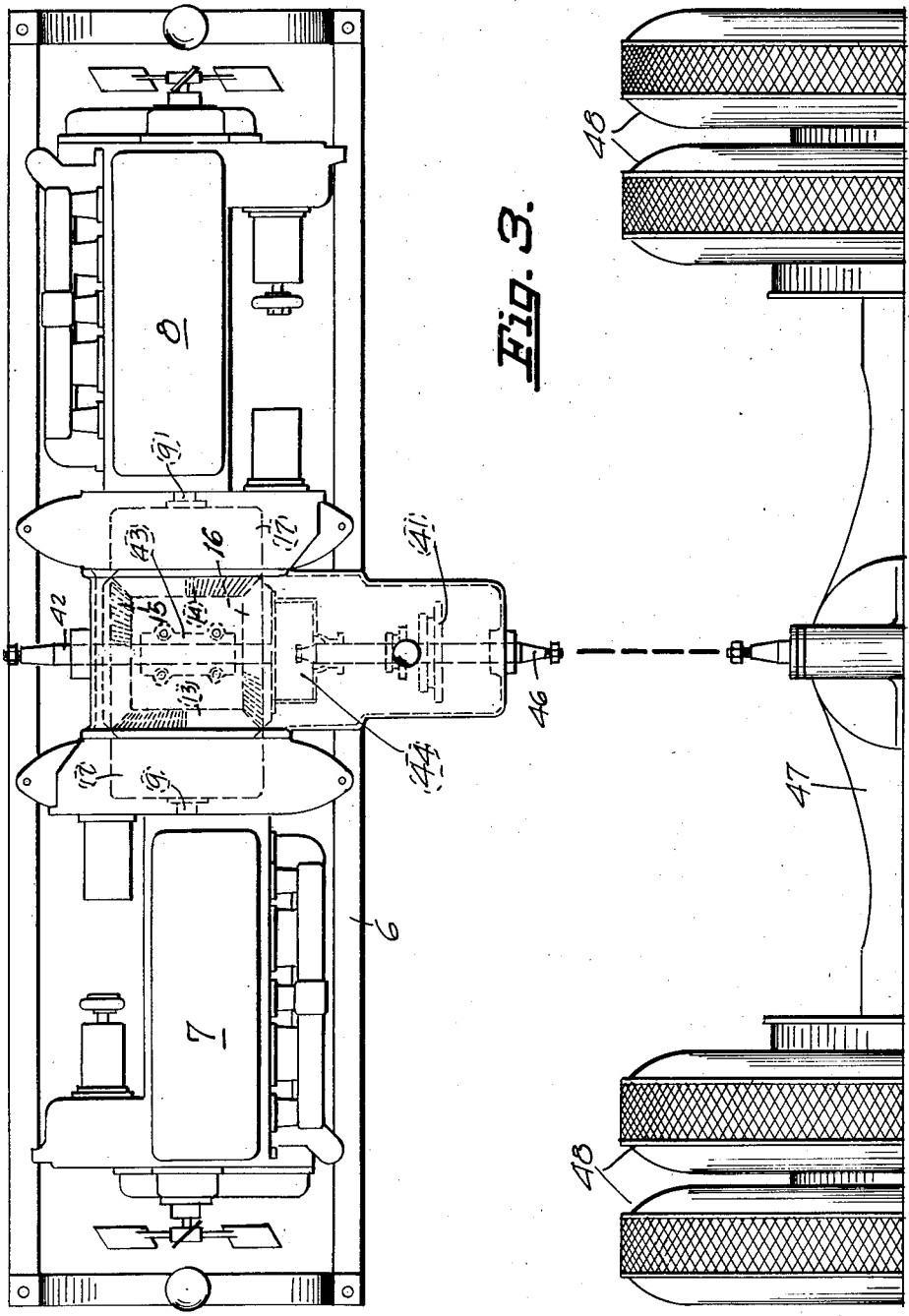
Fig. 3 is a plan view of a modified form of my power plant and transmission, illustrating the relative position thereof to an axle and the wheels of a vehicle.

In Fig. 3, I illustrate another arrangement of the power plant. The main difference between the embodiment heretofore set forth and this modified embodiment, is the arrangement of a selective transmission 41 outside of the bevel gears 13, 14, 15 and 16. In this embodiment a supporting shaft 42 is mounted in a bearing 43 in the casing 19. Upon this shaft 42 are rotatably supported the bevel gears 15 and 16. A clutch mechanism 44, connects a transmission shaft 46 directly to the bevel gear 16, the transmission shaft 46 transmitting the power and the rotation to the selective transmission 41 thru which power is transmitted in the usual manner.

In Fig. 3, I also show the relative position of a vehicle axle 47 and the wheels 48 thereon, so as to illustrate the possibility of disposing my entire power plant, parallel with the axle 47 and within the wheel base of the vehicle.

Figure 5:
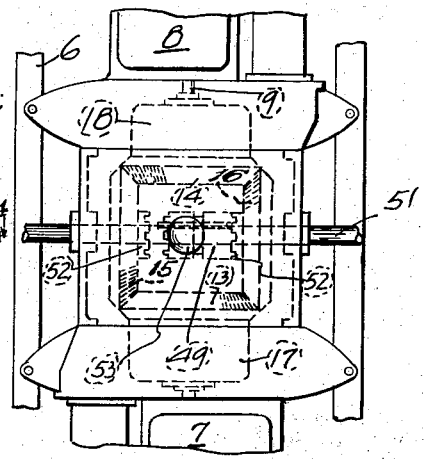
Fig. 5 is a plan view showing another modified shift mechanism for the transmission.

Another embodiment of my invention is shown in Fig. 5, wherein a double throw shift mechanism or clutch 49 is slidably secured by a feather key to a power shaft 51, and is disposed between the bevel gears 15 and 16. The said bevel gears 15 and 16 are idling on the power shaft 51. Each bevel gear is provided with a female clutch jaw 52 on the inner face thereof, with which the clutch 49 may be selectively engaged. A shift lever for shifting the clutch 49 is indicated at 53. The power shaft 51 extends thru the casing 11 and is supported in suitable bearings thereon; the opposite ends of the shaft 51 are connected to the front and rear differentials respectively; the differentials are not shown, but it is to be understood that their design is such that the rotation of the power shaft 51 rotates both the front and rear axles in the same direction. The bevel gears 15 and 16 are rotating in opposite directions to each other, therefore if the connection of the clutch 49 with one of the bevel gears will result in a forward rotation of the wheels, then the connection of the same with the other bevel gear will reverse the direction of the rotation of the wheels. The rotation of front and rear axles is at all times perfectly synchronized.

It is to be noted that I support my auxiliary frame 6 on springs 56, on the main frame 57 of the vehicle.

It will be recognized that the power plant and transmissions heretofore set forth may be readily assembled either in the rear or in the front of the vehicle, below the vehicle body, and the parts thereof protruding above the main frame may be located at a point below the seats or the like of the vehicle, thereby materially increasing the paying space in the vehicle. The different shifting and clutch mechanisms may be operated by remote shifting mechanism, such as for instance the type described in my pending application, Serial No. 339,221, filed February 11, 1929.

The engines 7 and 8 of my power plant may have any number of cylinders and may be with upright or horizontally disposed cylinders, as long as the crank shafts thereof are maintained in alignment for engagement with the bevel gears of my transmission. It will be also recognized that a particularly efficient device is provided to accomplish the aforedescribed equalized and synchronized drive of a vehicle by two or more motors; and one which combines ruggedness of construction with positiveness of operation, especially adapting it for its use. Being of a unitary character, after the first adjustments of the proper relation of the engine strokes, my device does not require any further adjustment and lends itself to effective application for the purposes set forth.

Having thus described this invention, what I claim and desire to secure by Letters Patent is:

1. In combination two opposed coaxial driving elements rotated in opposite directions to each other; two driven elements each being supported in constant connection with both driving elements so as to be rotated thereby in opposite directions to each other; selective, speed change means between the driven elements cooperating with one of said driven elements to transmit movement therefrom to a driven mechanism, and a motor disposed outside of each driving element, the axes of rotation of said motors being coincident with the axis of rotation of said driving elements, the said driven mechanism being outside and independent from the other driven element.

2. In combination two opposed coaxial driving elements rotated in opposite directions to each other; two driven elements each being supported in constant connection with both driving elements so as to be rotated thereby in opposite directions to each other; selective speed change means between the driven elements cooperating with one of said driven elements to transmit movement therefrom to a driven mechanism; a clutch mechanism outside of and independent from the other driven element to engage said means with said driven mechanism, and a motor disposed outside of each driving element, the axes of rotation of said motors being coincident with the axis of rotation of said driving elements, the said driven mechanism being outside and independent from the other driven element.

3. In combination two opposed coaxial driving gears rotated in opposite directions to each other; two opposed driven gears, each being supported in constant mesh with both driving gears so as to cause the rotation of the driven gears in opposite directions to each other; selective speed change means between the driven gears cooperating with one of said driven gears to permit power therefrom to a driven mechanism, and a motor disposed endwise outside of and in colinear axial alignment with each driving gear to rotate the driving gears in opposite directions, the said transmission means and driven mechanism being independent of the other driven gear.

4. In combination two opposed motors disposed in colinear axial alignment, rotating in opposite directions to each other around the common axis of rotation thereof, and being spaced from each other; two opposed driving elements, disposed between said motors, one on each motor; two opposed driven elements each being supported in constant connection with both driving elements, so as to be rotated in opposite directions to each other; selective speed change means between the driven elements cooperating with one of said driven elements to transmit power therefrom to a driven mechanism; and a clutch mechanism outside of the other driven element to establish operative connection between the speed change means and the driven mechanism.

5. In combination two opposed motors in colinear axial alignment, rotating in opposite directions to each other around the common axis of rotation thereof, and being spaced from each other; two opposed gears disposed between the motors, one on each motor; two opposed driven gears between the driving gears, being supported on the opposite sides of the driving gears, and each being in constant mesh with both driving gears, so as to cause the rotation of the driven gears in opposite directions to each other; and selective speed change means between the driven gears cooperating with one of said driven gears to establish operative connection between the said driven gear and a mechanism to be driven thereby, the said mechanism being outside of and independent from the other driven gear.

6. The combination with a pair of opposed motors mounted in colinear axial alignment on a vehicle, of a casing between the motors, a bevel gear in the casing on the end of the shaft of each motor to be rotated thereby, a pair of driven bevel gears at right angles to the first bevel gears and in constant mesh with the latter, a shaft journaled in the casing and keyed to one of said driven gears, another shaft journaled in the casing in colinear coaxial alignment with the first shaft and being rotatably extended through the other driven bevel gear, selective transmission means connecting the first shaft to the second shaft, and means to connect the second shaft to a driven element of the vehicle.

7. The combination with a pair of opposed motors mounted in colinear axial alignment on a vehicle, of a casing between the motors, a bevel gear in the casing on the end of the shaft of each motor to be rotated thereby, a pair of driven bevel gears at right angles to the first bevel gears and in constant mesh with the latter, a shaft journaled in the casing and keyed to one of said driven gears, another shaft journaled in the casing in colinear coaxial alignment with the first shaft and being rotatably extended through the other driven bevel gear, selective transmission means connecting the first shaft to the second shaft; and a clutch mechanism outside of and independent from the second mentioned driven bevel gear to connect the second shaft to the propeller mechanism of the vehicle.

ALBERT R. MEISTER.